H. L. FISHER.
COTTON PICKING MACHINE.
APPLICATION FILED JULY 2, 1914.
1,262,031.
Patented Apr. 9, 1918.
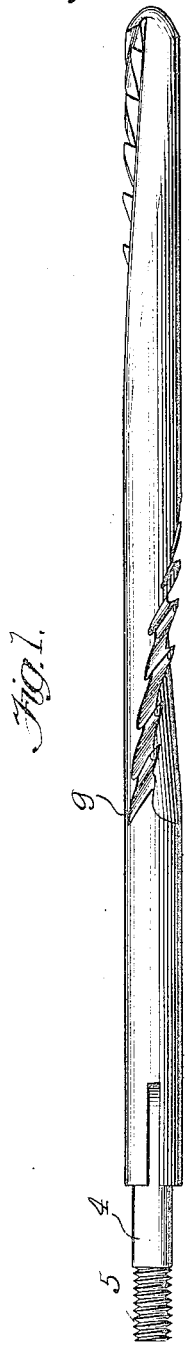
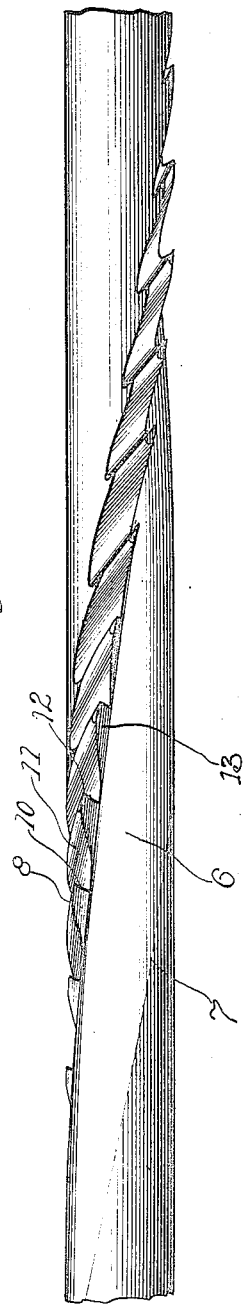
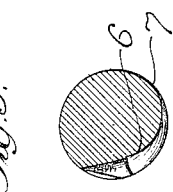
Witnesses
Robert Dobberman
M. F. Anthony
Inventor
Harvey L. Fisher
By
his Attys.

UNITED STATES PATENT OFFICE.

HARVEY L. FISHER, OF CHICAGO, ILLINOIS, ASSIGNOR TO DONALDSON & FISHER COMPANY, OF CHICAGO, ILLINOIS, A CORPORATION OF ARIZONA.

COTTON-PICKING MACHINE.

1,262,031. Specification of Letters Patent. Patented Apr. 9, 1918.

Application filed July 2, 1914. Serial No. 848,549.

*To all whom it may concern:*

Be it known that I, HARVEY L. FISHER, a citizen of the United States, residing at Chicago, in the county of Cook and State of Illinois, have invented certain new and useful Improvements in Cotton-Picking Machines, of which the following is a specification.

My invention relates to machines for picking cotton from the plants in the field and more particularly to machines of that class in which a mechanism is mounted upon a carriage to be drawn through a cotton field and provided with a number of fingers which are alternately projected into contact with the plants through or over which the machine is drawn, rotated to wind up upon them any cotton fiber with which they come into contact and then withdrawn into a chamber where they are wiped or drawn over scraping edges which doff or scrape off the adhering cotton from the fingers into a suitable receptacle. Examples of machines of this general type are found in U. S. patents to Campbell 542,794, July 16, 1895, and Pickering, 555,118, February 25, 1896.

For successful operations of machines of this character it is essential that the fingers be so constructed or formed that when projected into the plant and rotated they will immediately lay hold of and roll up any cotton with which they come into contact and yet not injure any green or unripe cotton bolls or parts of the plants against which they may be thrust. It is further necessary that the picker fingers be susceptible of being readily and completely stripped of any cotton which they may have gathered when they are drawn past the stripping edges referred to above, without breakage or injury to the fiber. It is the purpose of my invention to overcome the deficiencies and defects of prior devices of this character and it consists in an improved picker finger, a preferred form of which is shown in the accompanying drawings and described in the following specification. It is to be understood, however, that the specific disclosure is for the purpose of exemplification only and that the scope of the invention is defined in the following claims in which I have endeavored to distinguish my invention from the prior art so far as known to me without, however, relinquishing or abandoning any portion thereof.

Referring now to the accompanying drawings, Figure 1 is a side elevation of the preferred form of my picker finger on a somewhat enlarged scale; Fig. 2 is a similar but enlarged view of an intermediate portion of the finger and Fig. 3 a transverse section thereof.

The finger is made from a cylindrical bar of metal which is reduced at 4 and threaded at 5 for attachment to the means by which it is supported, reciprocated and rotated. This means may be of the character disclosed in the patents referred to above or consist in any other mechanism by which the finger is given the desired movements. The cotton engaging portion of the picker comprises a spiral set of teeth or burs, one edge of which is normal to the adjacent surface of the picker but the teeth at their other edge merge into the cylindrical surface of the finger, the crowns of the teeth being spirally arranged but at an acute angle to the abrupt or normal edges of the teeth so that the teeth come each to a fine sharp point at the corner adjacent the abrupt edge. The precise construction can perhaps better be understood from a description of a preferred method of making the picker finger. A helical kerf or slit is formed along the finger running from a point near the base to the end thereof and the metal forming one wall of the cut is filed or machined away as at 6 leaving a surface, curved in cross section which merges at 7 into the cylindrical surface of the bar from which the finger is formed. The other edge of the kerf is left normal, that is to say with each transverse linear element of its surface radial to the bar, and forms the side 13 of the series of teeth 8. The latter are conveniently made by filing diagonal or inclined transverse grooves 9 at an acute angle to the line of the kerf or the wall thereof, which grooves are slightly under-cut as to the rear walls 10 which form the advance edges of the teeth, but as to their forward walls 11 are eased or chamfered each to the edge of the next groove in advance, thus forming sharp edged, inclined, forwardly projecting teeth, the sides of which are formed from the wall of the kerf above mentioned (see Fig. 2). The result of thus forming the picker finger is that a spiral series of teeth extends throughout the engaging portion of the finger, all of which teeth have sharp points, corners or angles 12 at their forward ends by which the cotton is engaged. As seen in the several views, the teeth do not extend beyond the cylindrical surface of the rod and hence are incapable in their rotation of injuring the unripe cotton bolls or plants or of becoming broken by engagement with hard substances as woody stems and the like. The finger has no such longitudinal groove or overhang as to become gummed and stopped up by dirt, sap, etc., from bruised plants, the only grooves and undercut walls extending transversely of the finger, though at an angle thereto, and are therefore substantially self-cleaning under the rotation of the finger.

By reason of the spiral arrangement of the teeth as distinguished from an arrangement thereof strictly longitudinal of the finger, the cotton is much more readily stripped therefrom, because the small bunches or wisps of cotton gathered and supported by the several teeth are stepped or laterally displaced with reference to each other and therefore not being in an axial line do not offer their combined resistance to the action of the stripper. The latter, therefore, by reason of the offset of the successive teeth with respect one to the other, at any one time has only to overcome the resistance of the cotton on a comparatively small number of teeth, that on the remaining teeth being held at points sufficiently displaced from the cotton engaged by the scraper to afford it no support. Obviously, however, though the novel features of the construction contribute to the ease with which the finger may be stripped and kept clean, as pointed out above, they in no wise interfere with the ability of the finger or the teeth thereon to engage and wind up cotton.

I claim:

1. A picker finger for cotton picking machines comprising a rod having a longitudinally extending series of teeth thereon, one side wall of which series is substantially normal to the surface of the rod, the teeth being respectively undercut on one face.

2. A picker finger for cotton picking machines comprising a rod having a longitudinal series of teeth, one longitudinal wall of which series is substantially normal to the surface of the rod, the body of the bar being eased away from the base of said wall into the cylindrical surface of said bar.

3. A picker for cotton picking machines comprising a generally cylindrical bar having a longitudinal series of teeth formed thereon, one side wall of the series being substantially normal to the surface of the bar and the other side of said series being formed by the curved surface of the bar.

4. A picker for cotton picking machines consisting of a generally cylindrical bar having a spiral series of teeth formed therein, the side wall of said series being substantially normal to the surface of the bar, and the body of the bar being eased away from the bottom of said wall into the cylindrical surface of the picker, said teeth each being formed with an undercut face.

HARVEY L. FISHER.

Witnesses:
JOHN B. McCAULEY,
ROBERT DOBBERMAN.